US008628251B2

United States Patent
Kondou

(10) Patent No.: US 8,628,251 B2
(45) Date of Patent: Jan. 14, 2014

(54) NEEDLE BEARING

(75) Inventor: Yutaka Kondou, Gunma (JP)

(73) Assignee: NSK Ltd., Tokyo (JP)

( * ) Notice: Subject to any disclaimer, the term of this patent is extended or adjusted under 35 U.S.C. 154(b) by 379 days.

(21) Appl. No.: 13/060,290

(22) PCT Filed: Dec. 24, 2010

(86) PCT No.: PCT/JP2010/073425
§ 371 (c)(1),
(2), (4) Date: Feb. 23, 2011

(87) PCT Pub. No.: WO2011/078359
PCT Pub. Date: Jun. 30, 2011

(65) Prior Publication Data
US 2011/0249928 A1    Oct. 13, 2011

(30) Foreign Application Priority Data

Dec. 25, 2009   (JP) ................................. 2009-294136

(51) Int. Cl.
*F16C 33/48* (2006.01)
(52) U.S. Cl.
USPC ........................................................ 384/572
(58) Field of Classification Search
USPC ......... 384/526, 560, 572, 614, 621, 623, 462, 384/470, 523, 577–579
See application file for complete search history.

(56) References Cited

U.S. PATENT DOCUMENTS 4,235,487 A * 11/1980 Schard .......................... 384/576
5,165,805 A * 11/1992 Bauer et al. .................. 384/572
5,848,846 A * 12/1998 Sugiyama et al. ............ 384/625

FOREIGN PATENT DOCUMENTS

JP    2004-211825 A    7/2004
JP    2006-258284 A    9/2006
JP     2008-8833 A     1/2008

OTHER PUBLICATIONS

English-language translation of an International Search Report (PCT/ISA/210), dated Jan. 25, 2011, issued by the International Searching Authority in counterpart International Application No. PCT/JP2010/073425.
English-language translation of the Written Opinion(PCT/ISA/237), dated Jan. 25, 2011, issued by the International Searching Authority in counterpart International Application No. PCT/JP2010/073425.
International Preliminary Report on Patentability (PCT/IB/373), dated Aug. 14, 2012, issued in counterpart International Application No. PCT/JP2010/073425.

* cited by examiner

*Primary Examiner* — James Pilkington
(74) *Attorney, Agent, or Firm* — Sughrue Mion, PLLC

(57) ABSTRACT

A needle bearing including a cage that is shrinkable or extensible in a circumferential direction, which can prevent plastic deformation and ensure both of a sufficient strength for axial torsion and a sufficient deformation amount. In a drawn cup needle bearing, a cage includes a plurality of elastic deformation portions along a circumferential direction thereof, which are shrunk in the circumferential direction. The elastic deformation portions are formed symmetrically with respect to an intermediate portion C in an axial direction of the cage.

2 Claims, 11 Drawing Sheets

NEEDLE BEARING

CROSS-REFERENCE TO RELATED APPLICATIONS

The present application is based on Japanese Patent Application No. 2009-294136 filed on Dec. 25, 2009, the contents of which are incorporated herein by reference.

TECHNICAL FIELD

The present invention relates to needle bearings, and in particular relates to needle bearings applied to an automobile drive system including an automatic transmission (AT), a manual transmission (MT), a differential gear, a transfer and a detent, an engine crankshaft support, an engine camshaft support, and an automobile steering system.

BACKGROUND ART

In an automatic transmission or the like of an automobile, instead of a slide bearing (bushing), a drawn cup needle bearing having a similar cross-sectional height has recently been used at a position where a radial load is received. As illustrated in FIG. 10, a drawn cup needle bearing 100 includes: a drawn cup outer ring 101 having, at its inner peripheral surface, a raceway surface 101a and having, at its end portions, a pair of flanges 101b, 101c; a plurality of needles 102 placed inside the drawn cup outer ring 101 so as to be rolled along the raceway surface 101a; and a cage 103 having a plurality of pockets for holding the plurality of needles 102.

Methods for providing the foregoing drawn cup needle bearing include: a method in which a swaged portion serving as the flange 101c of the drawn cup outer ring 101 is subjected to anti-carburization, hardening is carried out by a process such as carburization or carbonitriding, and then the needles 102 and the cage 103 are inserted to swage an end portion; and a method in which the drawn cup outer ring 101 is hardened by a process such as carburization or carbonitriding, and then the needles 102 and the cage 103 are inserted to anneal a swaged portion by induction heating or the like and perform swaging thereon. Such methods further include the adoption of a method in which needles and a cage are built into a drawn cup outer ring and then heat treatments such as carbonitriding, quenching and tempering are carried out to perform processes such as the above-mentioned anti-carburization and induction heating on a swaged portion.

On the other hand, there has been proposed a method in which a cage having, at its circumferential part, a radially inwardly deformable portion is used, the cage is placed inside a drawn cup outer ring while being shrunk circumferentially by radially inwardly deforming the cage, and needles are attached to the placed cage, thereby fabricating a drawn cup needle bearing while avoiding the above-described complicated processes (see Patent Document 1, for example).

Also in a radial needle bearing, as illustrated in FIG. 11, a cage 200 is provided, at its one circumferential position, with an elastic connector 201 formed symmetrically with respect to an axial intermediate portion, and this elastic connector 201 is circumferentially increased in diameter and thus placed beyond a flange (see Patent Document 2, for example).

PRIOR ART REFERENCE

Patent Document

Patent Document 1: JP-A-2004-211825
Patent Document 2: JP-A-2008-8833

SUMMARY OF THE INVENTION

Actually, when a cage thickness cannot be sufficiently ensured in the cage described in Patent Document 1, there occurs a problem that the cage causes plastic deformation and cannot successfully hold the needles. On the other hand, the cage described in Patent Document 2 is capable of ensuring a sufficient strength for axial torsion but might be incapable of obtaining a sufficient deformation amount for a radial dimension of the flange because an elastic deformation portion is provided at only one circumferential position. Furthermore, an object of this cage is to increase diameter in a circumferential direction, and the elastic connector is connected to columns.

The present invention has been made in view of the above-described circumstances, and an object of the present invention is to provide a needle bearing having a circumferentially shrinkable or extensible cage capable of preventing plastic deformation and capable of ensuring both of a sufficient strength for axial torsion and a sufficient deformation amount.

The above object of the present invention can be achieved with the following configuration.

(1) A needle bearing comprises:
  a bearing ring comprising:
    a raceway surface at an inner peripheral surface thereof or an outer peripheral surface thereof; and
    a pair of flanges at both ends thereof;
  a plurality of needles disposed in the bearing ring to be rotatable along the raceway surface; and
  a cage comprising a plurality of pockets for holding the plurality of needles therein,
  wherein the cage comprises a plurality of elastic deformation portions along a circumferential direction thereof, the plurality of elastic deformation portions being shrunk or extended in the circumferential direction, and
  wherein the elastic deformation portions are formed symmetrically with respect to an intermediate portion in an axial direction of the cage.

(2) In the needle bearing according to item (1), the cage comprises:
  a pair of rims formed by a plurality of arc-shaped portions; and
  a plurality of columns through which the pair of rims are axially connected to each other,
  wherein the pair of rims are formed with a plurality of cuts in the same phase in the circumferential direction between end portions of the arc-shaped portions adjacent to each other in the circumferential direction, and
  wherein each of the elastic deformation portions is extended axially inward from the respective end portions of the arc-shaped portions adjacent to each other, and
  each of the elastic deformation portions has a pair of elastic deformation pieces through which the extended portions of the elastic deformation portion are connected to each other.

(3) In the needle bearing according to the item (2), each of the elastic deformation portions is formed between the columns adjacent to each other in the circumferential direction, and wherein a circumferential distance of the cut is smaller than a total sum of circumferential distances between the adjacent columns and the elastic deformation pieces.

In a needle bearing according to the present invention, a cage is circumferentially provided with a plurality of elastic deformation portions that are allowed to be circumferentially shrunk or extended, and the elastic deformation portions are formed symmetrically with respect to an axial intermediate portion, thus making it possible to provide the circumferentially shrinkable or extensible cage capable of preventing plastic deformation and capable of ensuring both of a sufficient strength for axial torsion and a sufficient deformation amount.

DETAILED DESCRIPTION OF THE EXEMPLARY EMBODIMENTS

Hereinafter, a needle bearing according to each embodiment of the present invention will be described in detail with reference to the drawings.

First Embodiment

Figure 1:
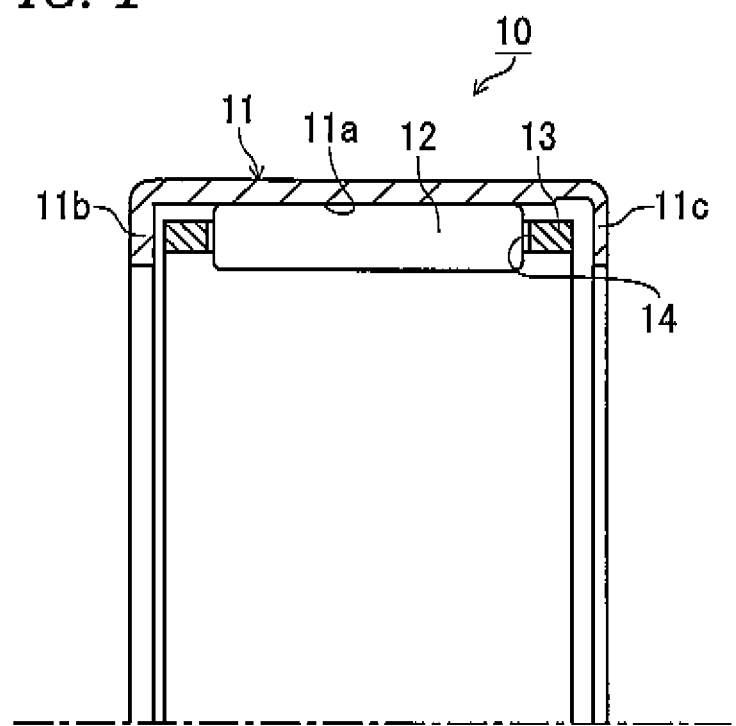
FIG. 1 is a cross-sectional view of a drawn cup needle bearing according to a first embodiment of the present invention.

A drawn cup needle bearing 10 according to a first embodiment is placed, for example, between gear trains in an AT, between a gear shaft and a housing or at a lateral position with respect to an oil pump gear, and is reduced in thickness at a bearing cross-sectional height of about 1.0 mm to about 3.5 mm. As illustrated in FIG. 1, this drawn cup needle bearing 10 includes: a drawn cup (collared outer ring) 11 serving as a bearing ring having, at its inner peripheral surface, a raceway surface 11a and having, at its end portions, a pair of inward flanges 11b, 11c; a plurality of needles 12 placed inside the drawn cup 11 so as to be rolled along the raceway surface 11a of the drawn cup 11; and a cage 13 having a plurality of pockets 14 for holding the plurality of needles 12, thereby rotatably supporting an unillustrated shaft (or an inner ring member).

The drawn cup 11 is formed into a cylindrical shape as a whole by performing plastic working such as drawing on a material such as a special alloy steel sheet, and the pair of flanges 11b, 11c are formed by being bent by press working. In addition, the drawn cup 11 is hardened by a heat treatment by a carburization or carbonitriding process.

Figure 2:
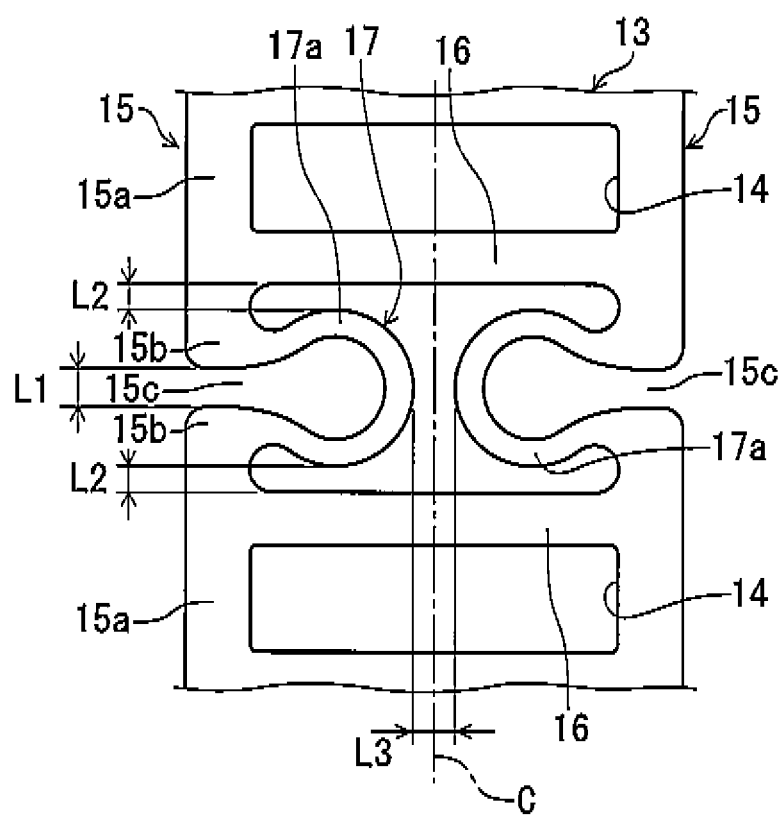
FIG. 2 is a partially enlarged plane view of a cage illustrated in FIG. 1.

Further, as illustrated in FIG. 2, the cage 13 includes: a pair of rims 15, 15; and a plurality of columns 16 through which the pair of rims 15, 15 are axially connected to each other. The pair of rims 15, 15 are each formed by a plurality of (four in the present embodiment) arc-shaped portions 15a, and a plurality of cuts 15c are formed in the rims 15, 15 in the same phase in a circumferential direction between end portions 15b, 15b of the arc-shaped portions 15a circumferentially adjacent to each other. Note that the number of the needles 12 is reduced when the number of the cuts 15c is increased, and therefore, the number of the cuts 15c is preferably two to six.

Furthermore, at positions between the circumferentially adjacent columns 16, 16 where the cuts 15c are formed, the cage 13 is circumferentially provided with a plurality of elastic deformation portions 17 that are allowed to be circumferentially shrunk.

With the end portions 15b, 15b of the circumferentially adjacent arc-shaped portions 15a, 15a serving as base ends, the elastic deformation portions 17 are each extended axially inward from the respective end portions 15b, and each have a pair of elastic deformation pieces 17a, 17a through which the extended regions are circumferentially connected to each other. The pair of elastic deformation pieces 17a, 17a have the same shapes, and the elastic deformation portion 17 is formed symmetrically with respect to an axial intermediate portion C.

Figure 3:
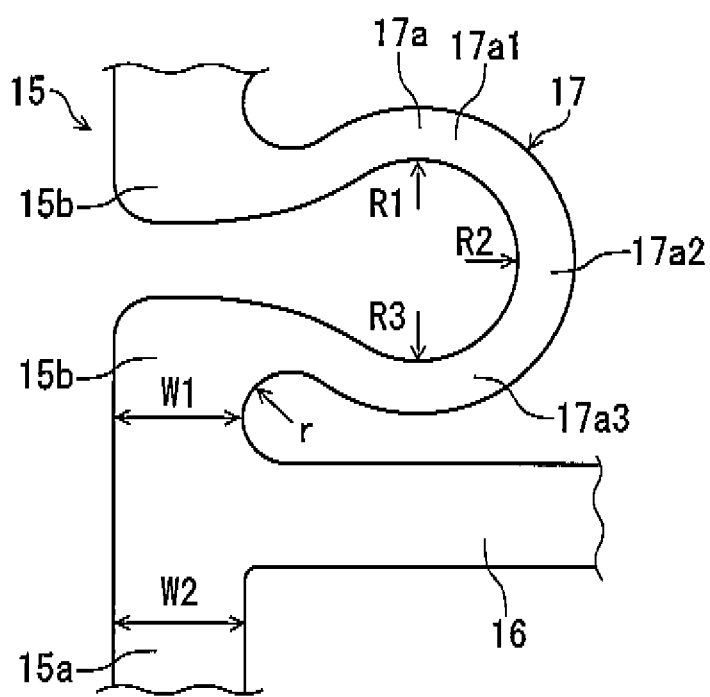
FIG. 3 is an enlarged plane view of a main part of FIG. 2.

As illustrated in FIG. 3 in an enlarged manner, each elastic deformation piece 17a is formed by a plurality of arcs 17a1, 17a2 and 17a3 having radii of curvature R1 to R3, respectively. It is to be noted that each elastic deformation piece 17a may be formed by a single arc.

Further, in consideration of strength of the base end, an axial width w1 of each end portion 15b of the arc-shaped portion 15a, serving as the base end of the elastic deformation piece 17a, is preferably equal to or greater than an axial width w2 of the arc-shaped portion 15a. Furthermore, a curvature of an arc surface formed at an axially inner surface of the base end is preferably large (i.e., preferably has a small radius of curvature r).

Figure 4:
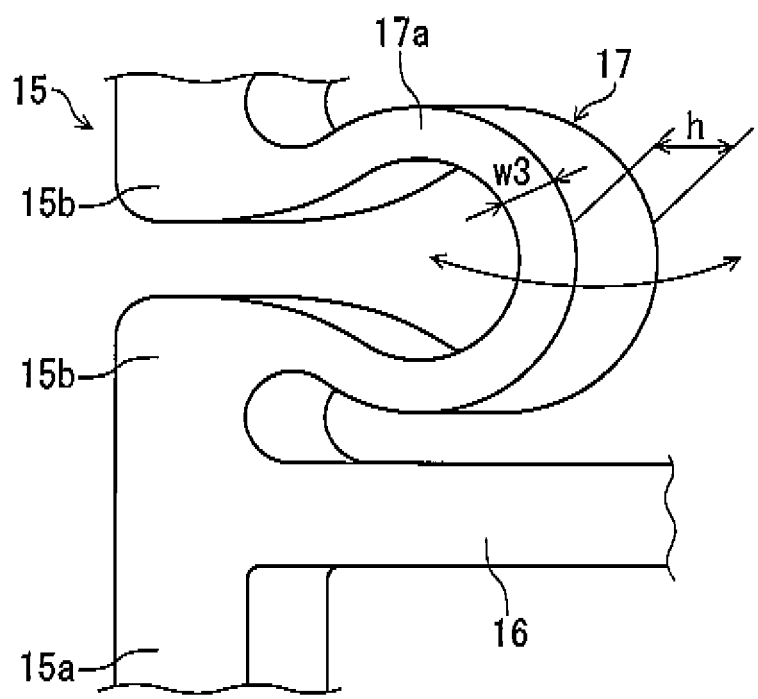
FIG. 4 is an explanatory diagram illustrating radial deformation of an elastic deformation portion illustrated in FIG. 2.

Moreover, as illustrated in FIG. 4, a radial thickness h of the elastic deformation piece 17a is set to be larger than a width w3 of the elastic deformation piece 17a, thus making it possible to suppress radial deformation indicated by the arrows.

Figure 5:
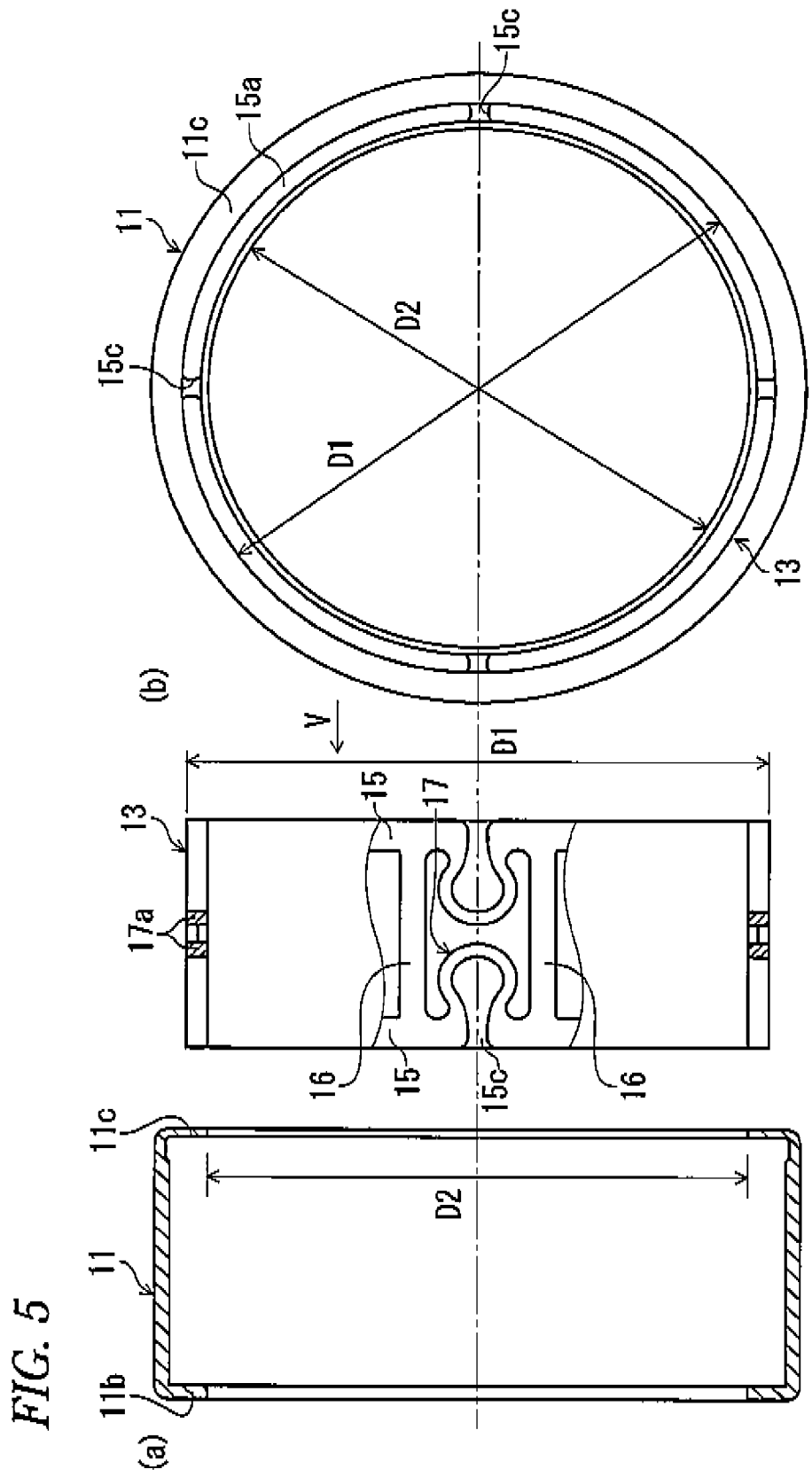
FIG. 5(a) illustrates the cage before elastic deformation and a cross-sectional view of a drawn cup.
FIG. 5(b) is a side view seen in a direction V of FIG. 5(a)
Figure 6:
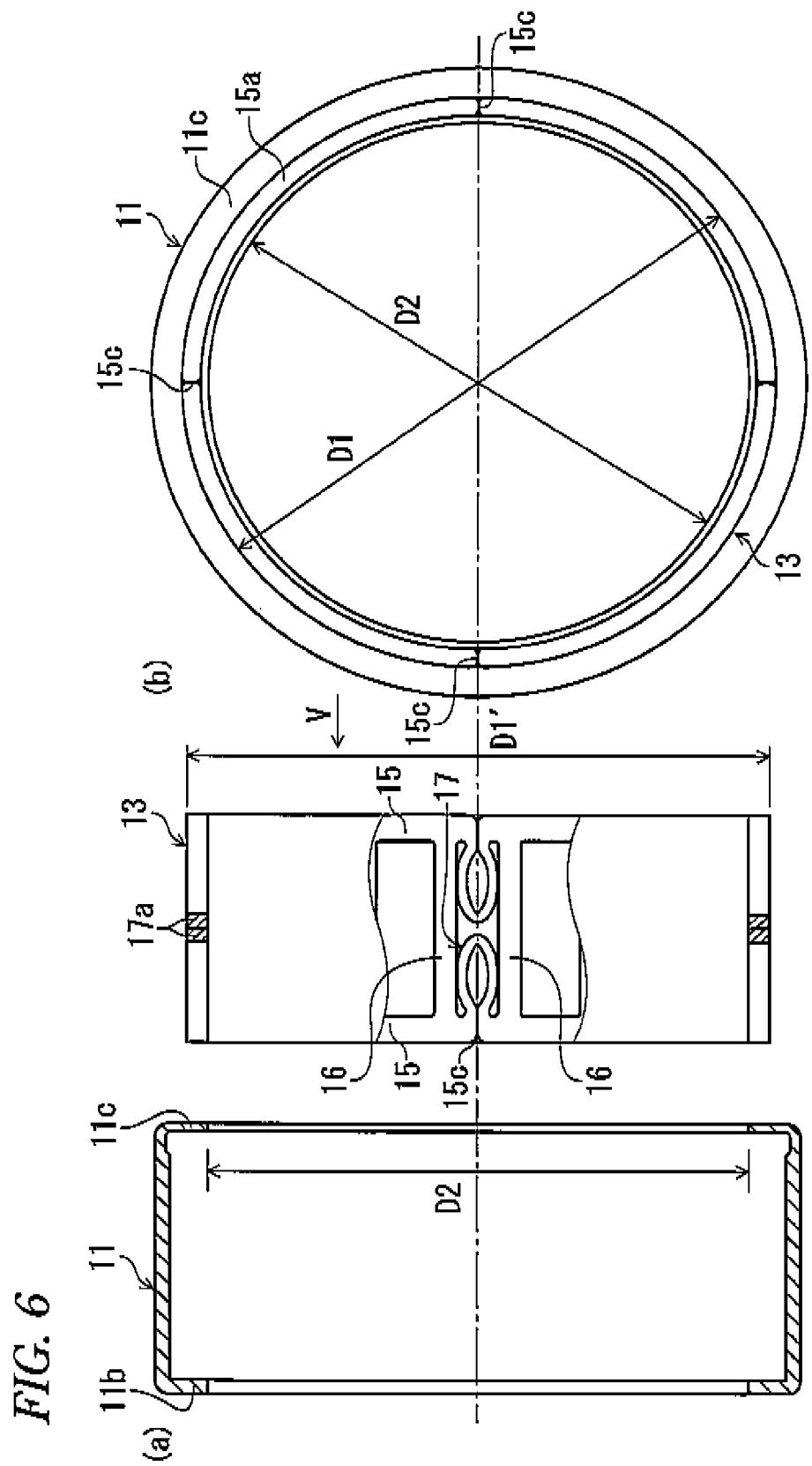
FIG. 6(a) illustrates the cage after elastic deformation and a cross-sectional view of the drawn cup.
FIG. 6(b) is a side view seen in a direction VI of FIG. 6(a)

As illustrated in FIG. 5, in the cage 13 having an outer diameter D1, the elastic deformation portion 17 is deformed, thereby narrowing a circumferential distance L1 of the cut 15c and shrinking the cage 13 in a circumferential direction. As a result, as illustrated in FIG. 6, the cage 13 is reduced in diameter to an outer diameter D1' smaller than an inner diameter D2 of the drawn cup 11, and is thus inserted into the drawn cup 11. Accordingly, a relationship among an outer peripheral length of the cage 15, a total sum of the circumferential distances L1 of the cuts 15c, and an inner peripheral length of the inward flanges 11b, 11c of the drawn cup 11 is represented by the following expression:

$$\pi \cdot D1 - L1 \times (\text{number of cuts}) < \pi \cdot D2$$

Figure 7:
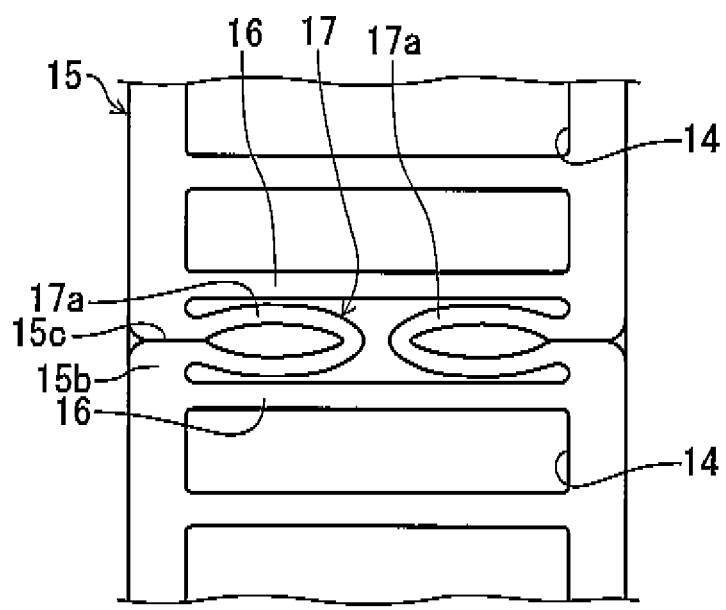
FIG. 7 is an enlarged view of a main part of the cage after elastic deformation.

Note that a movable range, i.e., a deformation amount of each elastic deformation piece, is freely settable in accordance with an axial distance L3 between the pair of elastic deformation pieces 17a, 17a and the circumferential distance L1 of the cut 15c. However, so as to prevent the columns 16 and the elastic deformation pieces 17a from coming into contact with each other before the cuts 15c disappear, the circumferential distance L1 of the cut 15c prior to elastic deformation is set to be smaller than a total sum of circumferential distances L2, L2 between the adjacent columns 16 and elastic deformation pieces 17a. Hence, although FIG. 6 illustrates a state in which the columns 16 and the elastic deformation pieces 17a come into contact with each other and the elastic deformation pieces 17a come into contact with each other upon disappearance of the cuts 15c, the columns 16 and the elastic deformation pieces 17a might not come into contact with each other and the elastic deformation pieces 17a might not come into contact with each other upon disappearance of the cuts 15c as illustrated in FIG. 7.

Accordingly, in the drawn cup needle bearing 10 of the present embodiment, the cage 13 is circumferentially provided with the plurality of elastic deformation portions 17 that are allowed to be circumferentially shrunk, and the elastic deformation portions 17 are formed symmetrically with respect to the axial intermediate portion C, thus making it possible to provide the cage 13 capable of being circumferentially shrunk while preventing plastic deformation, obtaining a sufficient strength for axial torsion, and ensuring a sufficient deformation amount. Besides, the elastic deformation portions 17 allow movements of the needles 12 and can thus also prevent fretting.

In addition, the pair of rims 15, 15 are formed by the plurality of arc-shaped portions 15a, 15a, and the plurality of cuts 15c are formed in the pair of rims 15, 15 in the same phase in a circumferential direction between the end portions of the circumferentially adjacent arc-shaped portions 15a; furthermore, the elastic deformation portions 17 are each extended axially inward from the respective end portions 15b of the adjacent arc-shaped portions 15a, and each have the pair of elastic deformation pieces 17a, 17a through which the extended regions are circumferentially connected to each other. Thus, the elastic deformation portions 17 symmetrical with respect to the axial intermediate portion C can be formed.

Moreover, each elastic deformation portion 17 is formed between the circumferentially adjacent columns 16, 16, and the circumferential distance L1 of the cut 15c is smaller than a total sum of the circumferential distances L2 between the adjacent columns 16 and elastic deformation pieces 17a; hence, when circumferential shrinkage is caused, the columns 16 and the elastic deformation pieces 17a will not come into contact with each other before the cuts 15c disappear, thus making it possible to ensure a sufficient deformation amount.

Second Embodiment

Figure 8:
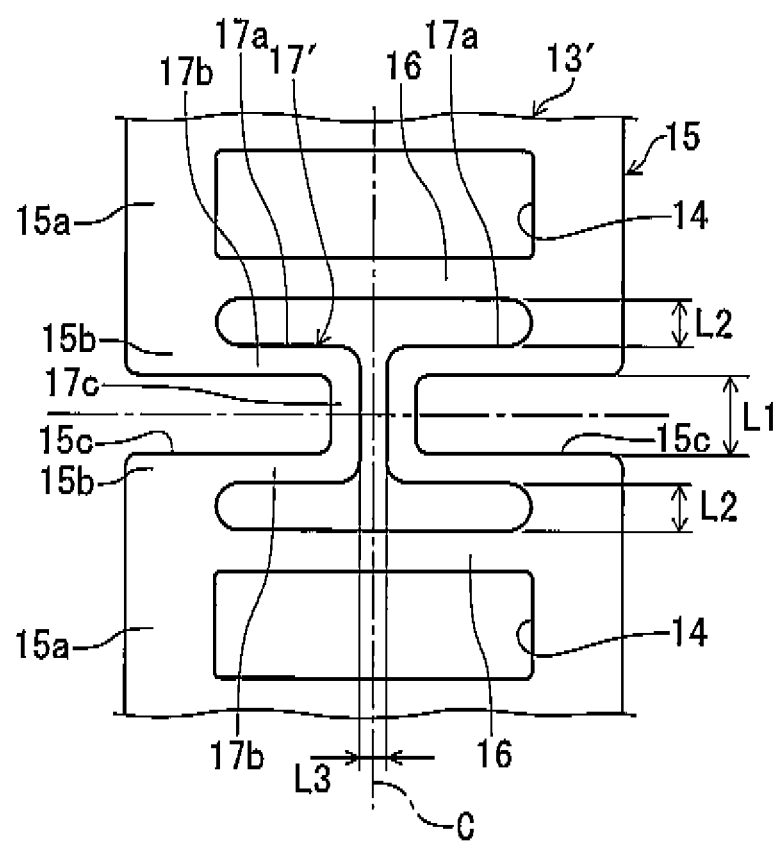
FIG. 8 is a partially enlarged plane view of a cage of a drawn cup needle bearing according to a second embodiment of the present invention.

FIG. 8 illustrates a cage 13' of a drawn cup needle bearing according to a second embodiment of the present invention. This cage 13' is also circumferentially provided with a plurality of (four in the present embodiment) elastic deformation portions 17', which are allowed to be circumferentially shrunk or extended, at positions between circumferentially adjacent columns 16, 16 where cuts 15c are formed.

With end portions 15b, 15b of circumferentially adjacent arc-shaped portions 15a, 15a serving as base ends, the elastic deformation portions 17' each have a pair of elastic deformation pieces 17a, 17a including: axially extended portions 17b, 17b extended axially inward and substantially linearly from the end portions 15b, 15b; and circumferential connection portions 17c, 17c through which the axially extended portions 17b, 17b are substantially linearly connected to each other in a circumferential direction. The pair of elastic deformation pieces 17a, 17a have the same shapes, and the elastic deformation portions 17 are formed symmetrically with respect to an axial intermediate portion C.

Note that also in the present embodiment, a movable range, i.e., a deformation amount of each elastic deformation piece, is freely settable in accordance with an axial distance L3 between the pair of elastic deformation pieces 17a, 17a and a circumferential distance L1 of the cut 15c. However, so as to prevent the columns 16 and the elastic deformation pieces 17a from coming into contact with each other before the cuts 15c disappear, the circumferential distance L1 of the cut 15c prior to elastic deformation is set to be smaller than a total sum of circumferential distances L2, L2 between the adjacent columns 16 and elastic deformation pieces 17a.

Accordingly, also in the drawn cup needle bearing 10 of the present embodiment, the cage 13' is circumferentially provided with the plurality of elastic deformation portions 17' that are allowed to be circumferentially shrunk, and the elastic deformation portions 17' are formed symmetrically with respect to the axial intermediate portion C, thus making it possible to provide the cage 13' capable of being circumferentially shrunk while preventing plastic deformation, obtaining a sufficient strength for axial torsion, and ensuring a sufficient deformation amount.

Note that in the elastic deformation portions 17' of the present embodiment, the elastic deformation pieces 17a will not come into contact with each other by deformation, but stress concentration is likely to occur because they have shapes with corners; hence, the shapes of the elastic deformation portions 17 according to the first embodiment are more preferable. Besides, the shapes of the elastic deformation portions 17 according to the first embodiment are more preferable also in terms of formability during injection molding since resin fluidity is high.

Note that the present invention is not limited to each of the foregoing embodiments, but suitable modifications, improvements and the like may be made.

Figure 9:
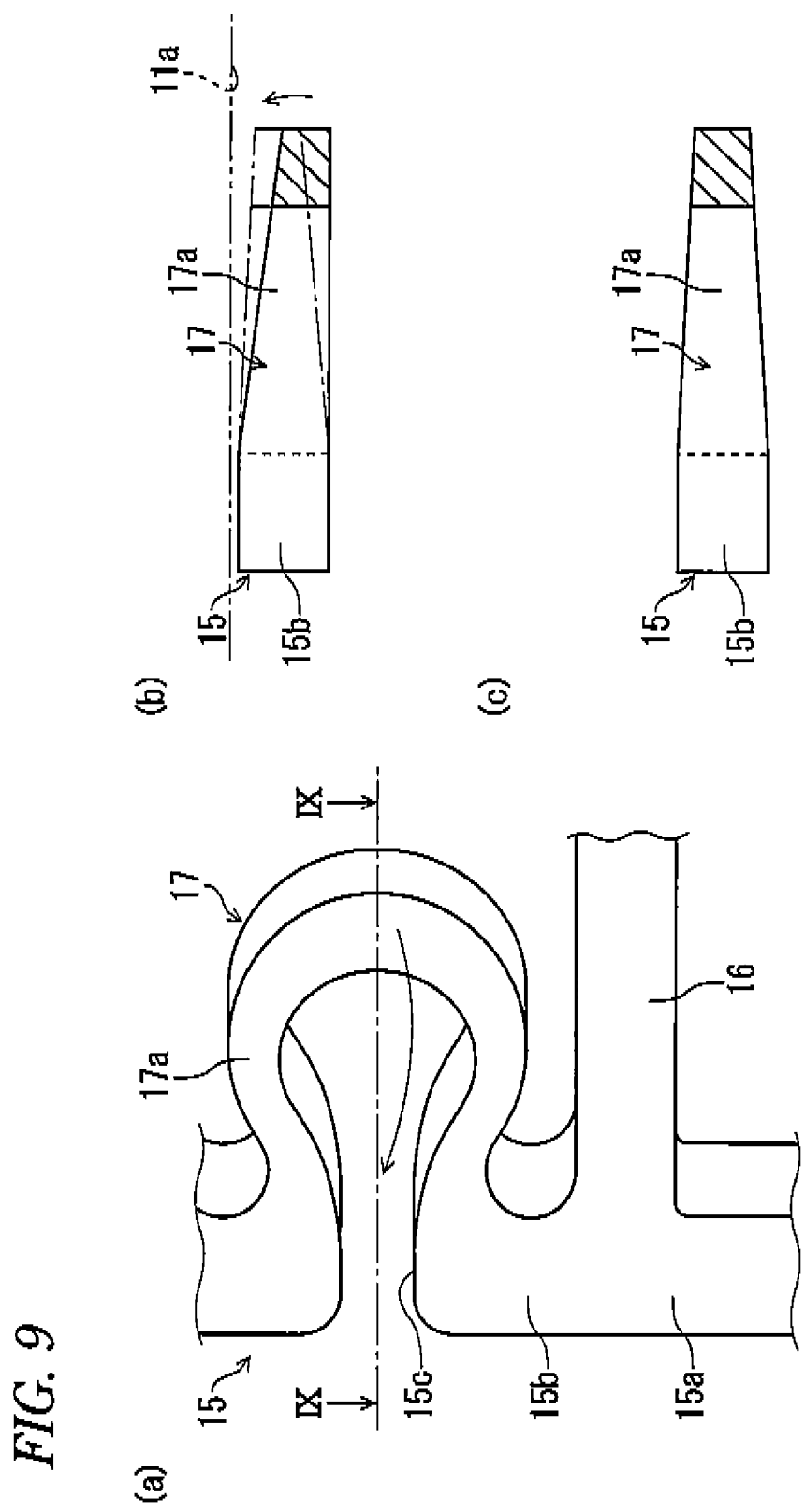
FIG. 9(a) is an explanatory diagram illustrating radial deformation in a variation of an elastic deformation portion.
FIG. 9(b) is a cross-sectional view taken along the line IX-IX of FIG. 9(a)
FIG. 9(c) is a cross-sectional view according to another variation of the elastic deformation portion and corresponding to FIG. 9(b)
Figure 10:
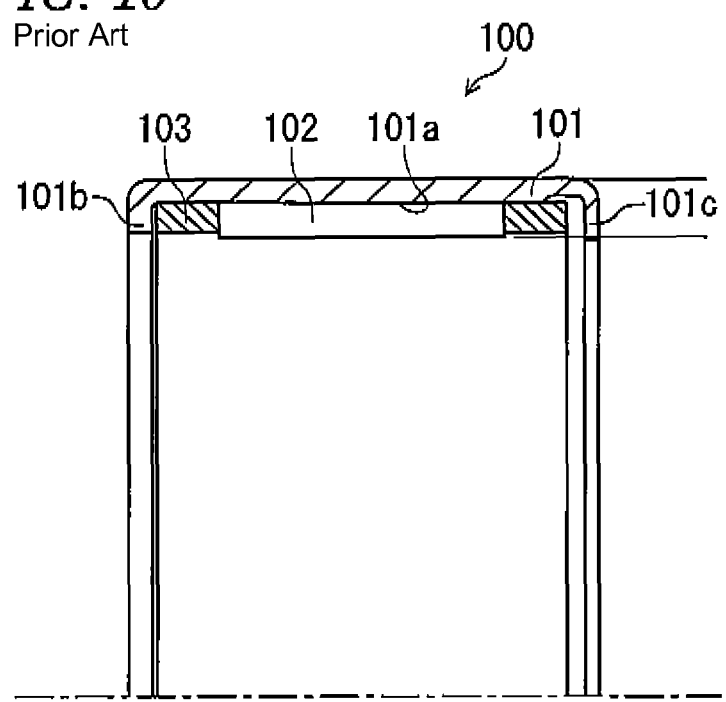
FIG. 10 is a cross-sectional view illustrating a conventional drawn cup needle bearing.
Figure 11:
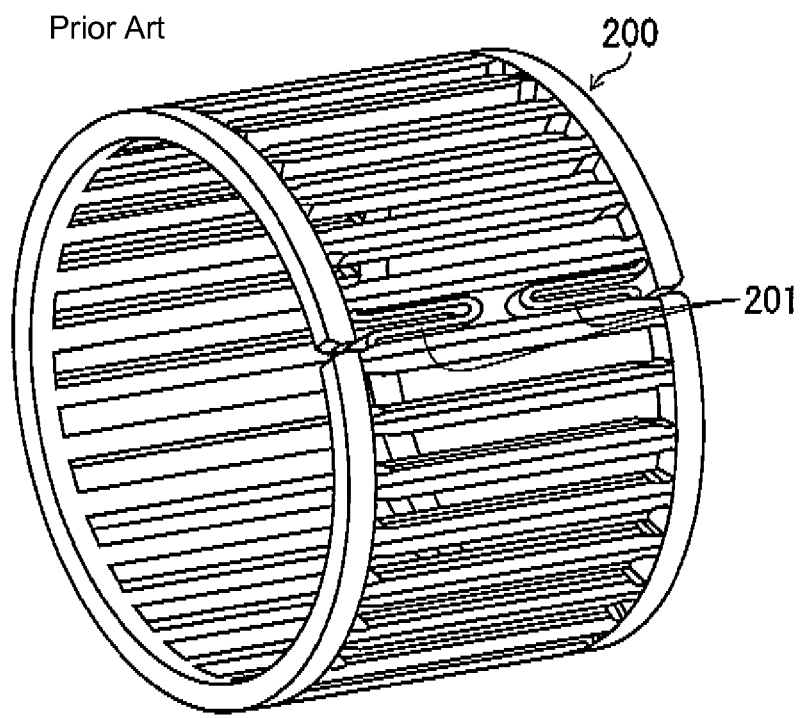
FIG. 11 is a perspective view illustrating a cage of another conventional needle bearing.

For example, as illustrated in FIGS. 9(a) and (b), an outer peripheral surface of the elastic deformation piece 17 of the elastic deformation portion 17 according to the first embodiment may be tapered so as to be gradually radially reduced in thickness from the end portions 15b of the arc-shaped portions 15 to an axial inward end portion of the elastic deformation piece 17a. As a result, even when the axial inward end portion of the elastic deformation piece 17a, which serves as a free end side thereof, is deformed radially outward due to centrifugal force as indicated by imaginary lines of FIG. 9(b), the axial inward end portion can be prevented from coming into contact with the raceway surface 11a of the drawn cup 11. Note that as illustrated in FIG. 9(c), in consideration of radially inward deformation of the axial inward end portion of the elastic deformation piece 17a, an inner peripheral surface of the elastic deformation piece 17a may also be tapered so as to be gradually radially reduced in thickness from the end portions 15b of the arc-shaped portions 15 to the axial inward end portion of the elastic deformation piece 17a. Alternatively, only the inner peripheral surface of the elastic deformation piece 17a may be tapered.

In each of the embodiments, the outer ring drawn cup 11 having, at its inner peripheral surface, the raceway surface 11a and having, at its end portions, the inward flanges 11b, 11c is used, but an inner ring drawn cup having, at its outer peripheral surface, a raceway surface and having, at its end portions, outward flanges may alternatively be used; in that case, the cage 13 is deformed so as to be circumferentially extended and is thus inserted into the drawn cup.

Further, a material for the cage is freely selected as long as it is elastically deformable, but a resin is preferably used; alternatively, a metal may be used, but it is more difficult for a metal to be elastically deformed than a resin, and therefore, the number of elastic deformation portions is set to be increased in that case.

Examples of resins to be used for the cage include: polyamide (nylon resin) such as aromatic polyamide (aromatic PA), polyamide 46, polyamide 6 and polyamide 66; polyphenylene sulfide (PPS); polyether ether ketone (PEEK); polyacetal (POM); and a fluorine resin such as polytetrafluoroethylene (PTFE). Alternatively, a mixture in which the foregoing resin(s) are/is mixed with reinforcing agent(s) such as glass fiber and/or carbon fiber may also be suitably used.

A mixture in which a polyamide resin is mixed with glass fiber or carbon fiber at 5% to 30% to provide a bending elastic modulus of 2000 MPa to 5000 MPa is more preferably used. When the bending elastic modulus falls within this range, deformation portions are allowed to have deformability and necessary rigidity in a more suitable manner.

In addition, the needle bearing according to the present invention achieves enhanced effects when the structure of the needle bearing is thin, but the present invention is also applicable to a needle bearing having any cross-sectional height. Moreover, although the drawn cup needle bearing obtained by bending and forming of a metal sheet has been described in each of the foregoing embodiments, the present invention is also applicable to a solid type needle bearing obtained by performing shaving on a metal material.

Besides, the cage 13 or 13' having the elastic deformation portions 17 or
17' according to the present embodiment is also applicable to a needle bearing having no bearing ring, such as a cage and roller assembly.

DESCRIPTION OF REFERENCE CHARACTERS

10 needle bearing
11 drawn cup (bearing ring)
11*a* raceway surface
11*b*, 11*c* inward flange (flange)
12 needle
13, 13' cage
15 rim
16 column
17, 17' elastic deformation portion

The invention claimed is:

1. A needle bearing comprising:
a bearing ring having two ends, the bearing ring comprising:
  a raceway surface at an inner peripheral surface thereof or an outer peripheral surface thereof; and
  a pair of flanges, one of the flanges being provided at one of the ends and another of the flanges being provided at the other one of the ends;
a plurality of needles disposed in the bearing ring to be rotatable along the raceway surface; and
a cage comprising a plurality of pockets for holding the plurality of needles therein,
wherein the cage comprises:
  a plurality of elastic deformation portions along a circumferential direction thereof, the plurality of elastic deformation portions being shrunk or extended in the circumferential direction,
  wherein the elastic deformation portions are formed symmetrically with respect to an intermediate portion in an axial direction of the cage,
  a pair of rims, each rim being formed by a plurality of arc-shaped portions; and
  a plurality of columns through which the pair of rims are axially connected to each other,
  wherein the pair of rims are each formed with a plurality of cuts between end portions of adjacent arc-shaped portions, the plurality of cuts of one of the rims of the pair of rims being provided in a same phase as the plurality of cuts of the other one the rims of the pair of rims,
  wherein each of the elastic deformation portions is extended axially inward toward the intermediate portion from the respective end portions of the adjacent arc-shaped portions, and
  each of the elastic deformation portions has a pair of elastic deformation pieces, each of the pair of elastic deformation pieces including an extended portion, the extended portions being connected to each other at one end;
  wherein the elastic deformation pieces are tapered.

2. The needle bearing according to claim 1,
wherein each of the elastic deformation portions is formed between the columns that are adjacent to each other in the circumferential direction, and
wherein a circumferential distance of the cut is smaller than a total sum of circumferential distances between the adjacent columns and the elastic deformation pieces.

* * * * *